US008076394B2

(12) United States Patent
Kabalnov

(10) Patent No.: US 8,076,394 B2
(45) Date of Patent: Dec. 13, 2011

(54) COMPOSITIONS AND METHODS FOR PRINTING ON SPECIALTY MEDIA

(75) Inventor: Alexey S Kabalnov, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 116 days.

(21) Appl. No.: 12/466,848

(22) Filed: May 15, 2009

(65) Prior Publication Data
US 2009/0225127 A1 Sep. 10, 2009

Related U.S. Application Data

(62) Division of application No. 09/859,864, filed on May 16, 2001, now abandoned.

(51) Int. Cl.
B01J 13/00 (2006.01)
B05D 1/36 (2006.01)
B05D 3/00 (2006.01)
B05D 5/00 (2006.01)
B05D 7/00 (2006.01)
B28B 19/00 (2006.01)
B29B 15/10 (2006.01)
B41J 2/01 (2006.01)
B41J 29/38 (2006.01)
C08F 290/04 (2006.01)
C08J 3/00 (2006.01)
C08K 3/20 (2006.01)
C08L 29/04 (2006.01)
C08L 51/00 (2006.01)
C09D 5/00 (2006.01)
C09D 11/00 (2006.01)
C23C 18/00 (2006.01)
C23C 20/00 (2006.01)
C23C 28/00 (2006.01)
D21H 21/14 (2006.01)
G01D 11/00 (2006.01)

(52) U.S. Cl. .......... 523/160; 347/1; 347/6; 347/95; 347/96; 347/100; 347/102; 427/256; 427/258; 427/273; 427/407.1; 427/419.1; 427/427.4; 523/161; 524/503; 524/504; 524/557; 524/906; 106/31.49; 106/31.13; 106/31.54; 106/31.78

(58) Field of Classification Search .............. 523/160, 523/161; 524/503, 504, 906, 557; 106/31.49, 106/31.13, 31.54, 31.78; 347/1, 6, 95, 96, 347/100, 102; 427/256, 258, 273, 407.1, 427/419.1, 427.4
See application file for complete search history.

(56) References Cited

U.S. PATENT DOCUMENTS

| 4,124,389 A | 11/1978 | Hoornstra et al. | 430/306 |
|---|---|---|---|
| 4,547,405 A | 10/1985 | Bedell et al. | 427/256 |
| 5,096,489 A | 3/1992 | Laver | 106/31.47 |
| 5,213,873 A | 5/1993 | Yasuda et al. | 428/195 |
| 5,270,103 A | 12/1993 | Oliver et al. | 428/219 |
| 5,352,503 A | 10/1994 | Drake et al. | 428/195 |
| 5,476,540 A | 12/1995 | Shields et al. | 524/251 |
| 5,494,759 A | 2/1996 | Williams et al. | 428/514 |
| 5,518,821 A | 5/1996 | Sakaki et al. | 428/500 |
| 5,569,529 A | 10/1996 | Becker et al. | 428/331 |
| 5,570,120 A | 10/1996 | Sakaki et al. | 347/105 |
| 5,609,993 A | 3/1997 | Hase et al. | 430/302 |
| 5,635,297 A | 6/1997 | Ogawa et al. | 428/290 |
| 5,662,997 A | 9/1997 | Onishi et al. | 428/331 |
| 5,683,793 A | 11/1997 | Malhotra et al. | 347/105 |
| 5,738,932 A | 4/1998 | Kondo et al. | 428/195 |
| 5,789,070 A | 8/1998 | Shaw-Klein et al. | 428/32.24 |
| 5,853,899 A | 12/1998 | Anderson et al. | 428/507 |
| 5,861,230 A | 1/1999 | Lambert et al. | 430/202 |
| 5,888,253 A | 3/1999 | Yamamoto et al. | 8/466 |
| 5,912,280 A | 6/1999 | Anton et al. | 523/161 |
| 5,985,425 A | 11/1999 | Tomizawa et al. | 428/212 |
| 6,001,463 A | 12/1999 | Shibahara et al. | 428/216 |
| 6,013,354 A | 1/2000 | Tomizawa et al. | 428/206 |
| 6,020,397 A | 2/2000 | Matzinger | 523/160 |
| 6,129,785 A | 10/2000 | Schliesman et al. | 106/482 |
| 6,140,406 A | 10/2000 | Schliesman et al. | 524/493 |
| 6,146,712 A | 11/2000 | Maeda et al. | 427/493 |
| 6,153,310 A | 11/2000 | Kato | 428/522 |
| 6,156,244 A | 12/2000 | Muller et al. | 264/2.6 |
| 6,165,606 A | 12/2000 | Kasahara et al. | 428/323 |

(Continued)

FOREIGN PATENT DOCUMENTS

| EP | 0900831 | 3/1999 |
|---|---|---|
| EP | 0900831 | 10/1999 |
| GB | 1015849 | 9/1964 |
| GB | 1015849 | 1/1966 |
| JP | 08-080633 | 9/1994 |

(Continued)

OTHER PUBLICATIONS de Zea Bermudez et al., "How to Learn and Have Fun with Poly(Vinyl Alcohol) and White Glue", Journal of Chemical Education, vol. 75, No. 11, Nov. 1998, pp. 1410-1418.*
Plastics Materials, 7th Ed., CP 1999.
Plastics Materials, 7th Ed. CP 1999.

Primary Examiner — Patrick D Niland

(57) ABSTRACT

Compositions and methods for printing on specialty media are disclosed. The methods comprise the steps of providing a fixing fluid, providing a dye- or pigment-based ink-jet ink containing an effective amount of a polyvinyl(alcohol-acetate) species, jetting the fixing fluid onto the specialty media forming a coated substrate, and jetting the ink-jet ink onto the coated substrate. Additionally, a gelled printed image on a substrate is disclosed comprising a fixing fluid containing a fixing agent and an aqueous ink-jet ink containing a polyvinyl (alcohol-acetate) species. In both the method and with respect to the image, the polyvinyl(alcohol-acetate) species used can be a known species, or one of a number of new graft copolymers containing a polyvinyl(alcohol-acetate) polymer as one of the constituents of the copolymer.

14 Claims, No Drawings

U.S. PATENT DOCUMENTS

| | | | |
|---|---|---|---|
| 6,177,187 B1 | 1/2001 | Niemoller et al. | 428/195 |
| 6,203,899 B1 | 3/2001 | Hirose et al. | 428/341 |
| 6,214,099 B1 | 4/2001 | Ueda et al. | |
| 6,214,417 B1 | 4/2001 | Watanabe et al. | 427/394 |
| 6,248,805 B1 | 6/2001 | Nguyen et al. | 523/160 |
| 6,261,353 B1 | 7/2001 | Doi et al. | 108/31.6 |
| 6,270,214 B1 | 8/2001 | Smith et al. | 347/101 |
| 6,326,060 B1 | 12/2001 | Ogawa | 427/382 |
| 6,372,818 B1 | 4/2002 | Kimura et al. | 523/161 |
| 6,395,459 B1 | 5/2002 | Taylor et al. | 430/434 |
| 6,406,138 B1 | 6/2002 | Gore | 347/96 |
| 6,482,883 B1 | 11/2002 | Cuch et al. | 524/492 |
| 6,485,812 B1 | 11/2002 | Sekiguchi | 428/195 |
| 6,488,753 B1 | 12/2002 | Ito et al. | 106/31.9 |
| 6,548,571 B1 | 4/2003 | Cheng et al. | 523/160 |
| 6,620,470 B2 | 9/2003 | Nojima et al. | 428/32.34 |

FOREIGN PATENT DOCUMENTS

| | | |
|---|---|---|
| JP | 7238243 | 9/1995 |
| JP | 08-080633 | 3/1996 |
| JP | 8209049 | 8/1996 |
| JP | 1178211 | 3/1999 |
| JP | 2000301821 | 10/2000 |

* cited by examiner

COMPOSITIONS AND METHODS FOR PRINTING ON SPECIALTY MEDIA

The present application is a divisional of U.S. application Ser. No. 09/859,864, filed on May 16, 2001 now abandoned.

FIELD OF THE INVENTION

The present invention is drawn to compositions and methods for printing on specialty media.

BACKGROUND OF THE INVENTION

In recent years, computer printer technology has evolved to a point where very high resolution images can be transferred to various media. One particular type of printing involves the placement of small drops of a fluid ink onto a surface in response to a digital signal. Typically, the fluid ink is placed or jetted onto the surface without physical contact between the printing device and the surface. The specific method for which the ink is deposited onto the printing surface varies from system to system. However, two major methods include continuous ink deposit and drop-on-demand ink deposit.

With regard to continuous printing systems, inks used are typically based on solvents including methyl ethyl ketone and/or ethanol. Essentially, continuous printing systems function as a stream of ink droplets are ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink-jet inks are typically based upon water and glycols. Essentially, with these systems, ink droplets are propelled from a nozzle by heat or by a pressure wave. Additionally, all of the ink droplets are used to form the printed image and are ejected when needed.

There are several reasons that ink-jet printing has become a popular way of recording images on surfaces, particularly paper. Some of these reasons include low printer noise, capability of high speed recording, multi-color recording, and potential versatility. Additionally, these advantages can be provided at a relatively low price. However, though there has been great improvement in ink-jet printing, accompanying this improvement are increased printing demands, e.g., higher speed, higher resolution, full color image formation, new applications, etc.

Papers used for ink-jet printing have typically included high-quality and wood-free papers designed to have high ink absorptivity or papers having a coated porous surface. These papers are functionally good for ink-jet printing because the inks may be absorbed readily and dry quickly. However, such papers often do not allow for a crisp or sharp image. Additionally, there are many potential substrates that do not provide avenues for absorption, and thus, typical ink-jet inks can puddle on those surfaces. For example, non-porous plastic is such a substrate.

Polyvinyl alcohol-acetate is a commercially available polymer produced by partial hydrolysis of polyvinyl acetate. However, there are various specific structures that can be formed based on several variables. For example, different chain length and degree of hydrolysis can effect the properties of the structure. Specifically, the solubility of polyvinyl(alcohol-acetate) in water is dependent, in part, upon the degree of hydrolysis that the polyvinyl acetate has undergone. To illustrate this, a fully hydrolyzed product is typically soluble only in hot water and tends to have a high degree of crystallinity in the dry state. On the other hand, a polyvinyl(alcohol-acetate) polymer that is about 88% hydrolyzed is water-soluble at room temperature. Non-hydrolyzed polyvinyl acetate is not water-soluble.

Polyvinyl(alcohol-acetate) has been widely used in making photo paper and special papers for ink-jet applications. However, its use as an ink-jet ink component has been very limited. The problems associated with the use of polyvinyl (alcohol-acetate) in ink-jet inks include poor long term and short term nozzle reliability due to increased viscosity and nozzle plugging.

One property of polyvinyl(alcohol-acetate) is that it can be gelled in presence of some chemicals, such as borax, boric acid, or copper sulfate. However, this property has not been known to be used for ink-jet applications. Though the formation of plasticized gels can be desirable when printing on certain types of media, e.g., specialty media including non-porous plastics, the difficulties associated with jetting are problematic.

Thus, it would be desirable to provide compositions and methods for printing on specialty media such that good pen reliability could be maintained, and yet also provide good gelation properties once printed on a substrate.

SUMMARY OF THE INVENTION

The present invention is drawn to compositions and methods for printing ink-jet inks onto various substrates, particularly on smooth non-porous substrates. Specifically, a method of printing on specialty media is disclosed comprising providing a fixing fluid containing a fixing agent, providing a dye- or pigment-based ink-jet ink containing an effective amount of a polyvinyl(alcohol-acetate) species, jetting the fixing fluid onto the specialty media forming a coated substrate, and jetting the ink-jet ink onto the coated substrate. The step of allowing the ink-jet ink and the fixing fluid containing the fixing agent to gel on the surface of the substrate is also a preferred step of the present invention.

Additionally, a gelled printed image on a substrate is disclosed comprising (a) a fixing fluid containing an effective amount of a fixing agent, printed in contact with (b) an aqueous inkjet ink comprising a low molecular weight humectant, an effective amount of a polyvinyl(alcohol-acetate) species, and an effective amount of a dye or pigment, such that the fixing agent and the ink-jet ink interact to form a gel on the substrate surface. For both the method and the gelled printed image, various polyvinyl(alcohol-acetate) species can be used including known polyvinyl(alcohol-acetate) polymers as well as some new graft copolymers disclosed herein.

Turning to the various novel compositions for use in ink-jet inks, a graft copolymer for ink-jet ink formulations is disclosed comprising glycerol having from 2 to 3 polyvinyl (alcohol-acetate) chains attached thereto, wherein the polyvinyl(alcohol-acetate) chains have a weight average molecular weight from about 300 to 10,000. Additionally, a graft copolymer for ink-jet ink formulations is disclosed comprising a polyvinyl(alcohol-acetate) polymer having a weight average molecular weight from about 300 to 10,000, and a polyethylene glycol chain having a weight average molecular weight from about 300 to 10,000, wherein the polyethylene glycol is attached by etherification to from 5% to 30% of the alcohol groups of the polyvinyl(alcohol-acetate). Further, a graft copolymer for ink-jet ink formulations is disclosed comprising a low molecular weight styrene-maleic acid ester copolymer having a weight average molecular weight from about 1,000 to 10,000; a polyvinyl(alcohol-acetate) chain attached thereto, wherein the polyvinyl(alcohol-acetate) has a weight average molecular weight from about 1,000 to 10,000.

DETAILED DESCRIPTION OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the content clearly dictates otherwise.

The term "species," when used in connection with polyvinyl(alcohol-acetate)s, includes partially and fully hydrolyzed polyvinyl(alcohol-acetate) polymers, as well as graft copolymers containing at least one polyvinyl(alcohol-acetate).

"Graft copolymer" includes copolymers where polyvinyl (alcohol-acetate) has been grafted into a second polymer or a second polymer has been grafted into the polyvinyl(alcohol-acetate). Additionally, more than two polymers can be present, as long as at least one is a polyvinyl(alcohol-acetate) polymer.

"Specialty media" includes substrates that are relatively smooth, and have difficulty absorbing conventional ink-jet inks. For example, plastics such as polyethylene, polyvinyl chloride and polystyrene, non-porous and low-porous coated papers, glasses, metals, and rubbers are examples of specialty media.

"Gelling" shall be defined as a state of consistency wherein an ink-jet ink (with or without a fixing agent) exhibits substantial increase in viscosity properties such that puddling on the surface of a substrate is minimized.

"Hydrolyzed" with respect to polyvinyl(alcohol-acetate), refers to the number of hydroxy groups or acetate groups that are present on the polymer.

"Humectant" can include any substance used as a wetting or moistening agent. The use of low molecular weight humectants that do not interfere with gelation are preferred.

"Fixing agent" or "fixer" shall be defined as any substance that, when combined with any polyvinyl(alcohol-acetate) species, causes some gelation to occur. For example, borax (sodium tetraborate), boric acid, and copper sulfate are good fixers for use with various polyvinyl(alcohol-acetate) species.

"Fixing fluid" or "fixer fluid" include any fluid(s) that contains a fixing agent in a functional concentration such that gelation will occur when in contact with an effective amount of a polyvinyl(alcohol-acetate) species.

"Image" is defined as any marking on a substrate.

A "surfactant" is a compound that contains a hydrophilic and a hydrophobic segment. Thus, when a surfactant is added to water or some other solvent, the surface tension of the system can be reduced. In general, surfactants can be used for several purposes including wetting, emulsifying, dispersing, foaming, scouring, or lubricating a system.

For purposes of the present invention, "low molecular weight," when describing humectants, includes molecular weight from about 100 to 1,000.

Polyvinyl alcohol-acetate [PV(Al—Ac)] can be modified to form a gel by the addition of small amount of certain complexing agents, e.g., boric acid or borax. Because of these gelation properties, it is possible to use polyvinyl(alcohol-acetate)s for certain inkjet ink applications. However, one of the main practical challenges involved in using polyvinyl (alcohol-acetate) in inkjet inks stems from issues of reliability. To illustrate, ink-jet inks in general require humectants to be present in the formulation. Humectants are typically high-boiling water-miscible organic compounds, such as polyols, amides, or polyethers. Specific examples include diethylene glycol, tetraethylene glycol, trimethylolpropane, glycerol, and 2-pyrrolidinone. Thus, when water evaporates from a printhead, humectants will not evaporate with the water creating a soft plug at the nozzles. At the same time, without the presence of one or more humectant, inks containing polyvinyl (alcohol-acetate) tend to crust. Additionally, by adding one or more humectant to a polyvinyl(alcohol-acetate)-containing ink-jet ink, interference with gelation properties can occur, making any gel formed less rigid. To solve this problems, appropriate selection of one or more humectant that will not interfere with the polyvinyl(alcohol-acetate) gelation is preferred.

With this in mind, the present invention is drawn to compositions and methods for ink-jet printing, particularly on specialty media. Specifically, a method of printing on specialty media is disclosed comprising providing a fixing fluid containing a fixing agent, providing a dye-based ink-jet ink containing an effective amount of a polyvinyl(alcohol-acetate) species, jetting the fixing fluid onto the specialty media forming a coated substrate, and jetting the ink-jet ink onto the coated substrate. The step of allowing the ink-jet ink and the fixing agent to gel is also a preferred step of the present invention. The gelling is effectuated as the fixing agent of the fixing fluid and the polyvinyl(alcohol-acetate) of the ink-jet ink contact one another and are allowed to react. Though the preferred embodiment provides that the fixing fluid be printed first, one skilled in the art would recognize that the ink-jet ink could be printed prior to the application of the fixing fluids for some applications.

Additionally, a gelled printed image on a substrate is disclosed which can be prepared by the methods described above, or other equivalent methods. The gelled printed image comprises at least two fluids printed in layers or in series, in either order. For example, one of the layers is provided as a fixing fluid containing an effective amount of a fixing agent is printed on a substrate. The other layer is provided as an aqueous inkjet ink comprising a low molecular weight humectant, an effective amount of a polyvinyl(alcohol-acetate) species, and an effective amount of a dye is printed such that contact occurs with the fixing fluid. Thus, the image on the substrate, prior to drying, can form a gel.

The fixing fluid, in order to provide appropriate gelling characteristics described above, must contain a fixing agent that interacts with a polyvinyl(alcohol-acetate) species to form a gel of appropriate consistency. The fixing agent can be suspended or dissolved in an appropriate fixing fluid as described. Examples of such fixing agents include the use of borax (sodium tetraborate), boric acid, and/or copper sulfate. Additionally, other optional ingredients can be present including certain humectants, wetting agents, surfactants, dyes, pigments, and combinations thereof, provided they do not substantially interfere with gelation.

With respect to the ink-jet ink, it is preferred that a humectant be present in order to prevent crusting and other known problems that occur when the humectant component is omitted. However, the humectant should be selected so that it does not interfere substantially with the gelation properties of the polyvinyl(alcohol-acetate)/fixing agent combination (once contact occurs). Appropriate humectants include low molecular weight polymers such as polyethylene glycol, glycereth including glycereth-7 and glycereth-1 (such as those sold under the tradenames LEG™-7 and LEG™1 respectively), tetraethylene glycol, urea, tetramethylurea, betaine, betaine hydrochloride, and combinations thereof.

As state previously, the polyvinyl(alcohol-acetate) species can be a partially hydrolyzed or fully hydrolyzed known polymer, or can be one of the new graft copolymers disclosed herein, i.e., a polyvinyl(alcohol-acetate)/second polymer graft copolymer. With respect to the degree of hydrolysis, a polyvinyl(alcohol-acetate) polymer that is hydrolyzed at from 70% to 100% is preferred. More specifically, from about 75% to 90% hydrolysis is more preferred, and about 88% is most preferred. No matter what polyvinyl(alcohol-acetate) species is used, an effective amount of a surfactant can be added to improve drying and reliability characteristics with respect to either the ink-jet ink formulations or the fixing fluid formulations.

Appropriate surfactants that can be added to the ink-jet ink composition in order to improve drytime and spreading include TRITONS™ (ethoxylated octylphenols), IGEPALS™ (alkyl phenoxypoly(ethleneoxy)ethanols), SILWETS™ (silicone glycol copolymers including polyalkylene oxide-modified polydimethylsiloxanes), SURFYNOLS™ (ethoxlyated tetramethyl decyndiols), TERGITOLS™ (including ethoxylated trimethylnonanols), BRIJS™ (polyoxyethylene ethers), PLURONICS™ (ethylene oxide/propylene oxide copolymers), FLUORADS™ and ZONYLS™ (fluorosurfactants), and NEODOLS™ (nonionic ethoxylated surfactants).

Turning now to the novel graft copolymers disclosed herein, several compositions are disclosed. Though these graft copolymers are functional with the methods and in preparing the images described, their use is not limited to these specific applications.

First, a graft copolymer for ink-jet ink formulations is disclosed comprising glycerol having from 2 to 3 polyvinyl (alcohol-acetate) chains attached thereto, wherein the polyvinyl(alcohol-acetate) chains have a weight average molecular weight from about 300 to 10,000. With this graft copolymer, the polyvinyl(alcohol-acetate) can be fully or partially hydrolyzed, though it is preferred that the polymer be partially hydrolyzed with respect to the methods and images described herein. There are essentially three preferred varieties of this specific embodiment of graft copolymer. In one variety, three polyvinyl(alcohol-acetate) chains can be etherified to a glycerol molecule. Second, two polyvinyl(alcohol-acetate) chains can be etherified to a glycerol molecule. In a third variety, two polyvinyl(alcohol-acetate) chains and one polyethylene oxide chain can be etherified to a glycerol molecule.

Next, a graft copolymer for ink-jet ink formulations is disclosed comprising a polyvinyl(alcohol-acetate) having a weight average molecular weight from about 300 to 10,000, and a polyethylene glycol chain having a weight average molecular weight from about 300 to 10,000, wherein the polyethylene glycol is attached by etherification to from 5% to 30% of the alcohol groups of the polyvinyl(alcohol-acetate). Again, the polyvinyl(alcohol-acetate) polymer can be partially or fully hydrolyzed, though an 88% hydrolyzed polymer is preferred.

Additionally, a graft copolymer for ink-jet ink formulations is disclosed comprising a low molecular weight styrene-maleic acid ester copolymer having a weight average molecular weight from about 1,000 to 10,000, and a polyvinyl (alcohol-acetate) chain attached thereto, wherein the polyvinyl(alcohol-acetate) has a weight average molecular weight from about 1,000 to 10,000. In this embodiment, the polyvinyl(alcohol-acetate) can be fully or partially hydrolyzed, though partial hydrolysis of about 88% is preferred. Additionally, in a preferred embodiment, there is one polyvinyl(alcohol-acetate) unit per each maleic acid unit.

Specific examples of graft copolymers that are functional with the present invention are described as follows. First, glycerol etherified with three polyvinyl alcohol-acetate 88% hydrolyzed chains is functional. Each side-chain can be of different or similar sizes. For example, three chains having molecular weights of 500 Mw, 1,000 Mw, and 2,000 Mw, respectively, exemplify good polymers for use. However, any polyvinyl(alcohol-acetate) structures at from 300 Mw to 10,000 Mw can be used. Second, glycerol etherified with two 88% hydrolyzed chains of polyvinyl alcohol-acetates and one polyethylene glycol chain (or two polyethylene glycol chains and one polyvinyl alcohol-acetate chain) can be functional. Again, from 300 Mw to 10,000 Mw for either the polyvinyl (alcohol-acetate) or the polyethylene glycol provides a functional range for use. Third, a partially hydrolyzed polyvinyl alcohol acetate (88% hydrolysis) randomly graft-etherified with polyethylene glycol is also functional. The degree of etherification can be varied from 5% to 30%. In other words, from 5% to 30% of the alcohol groups on the polyvinyl (alcohol-acetate) can tether a side chain of polyethylene glycol. Fourth, a low-molecular weight styrene-maleic acid anhydride co-polymer can be opened with polyvinyl alcohol-acetate (88% hydrolysis), and along the backbone, polyvinyl alcohol-acetate chains can be added to the opened ester.

EXAMPLES

The following examples illustrate the preferred embodiments of the invention that are presently best known. However, other embodiments may be practiced which are also within the scope of the present invention.

Example 1

Viscosity and Gelation Capability of Various Polyvinyl(Alcohol-acetate) Compositions Four different amounts of polyvinyl(alcohol-acetate) were dissolved in two different ink vehicles: one being water/LEG-7 mixture 8:2 w/w; the other being water/LEG-7 mixture 7:3 w/w. The polyvinyl(alcohol-acetate) used was Fluka 15,000 at 88% hydrolysis. The viscosity and gelation results are shown below in Tables 1a and 1b. The gelation was evaluated by mixing the polymer solution described above with 7.5% borax solution in water at 1:1 w/w mixing ratio.

TABLE 1a

| Concentration of pv(al-ac) present in LEG-7:water mixture | Viscosity water:LEG-7 8:2 w/w | Gelation at 7.5% Borax |
|---|---|---|
| 1% | 3.0 cPf | No |
| 3% | 5.5 cPf | No |
| 5% | 10.0 cPf | Yes |
| 7% | 20.0 cPf | Yes |

TABLE 1b

| Concentration of pv(al-ac) present in LEG-7:water mixture | Viscosity Water:LEG-7 7:3 w/w | Gelation at 7.5% Borax |
|---|---|---|
| 1% | 3.0 cPf | No |
| 3% | 6.5 cPf | No |
| 5% | 14.0 cPf | Yes |
| 7% | 28.0 cPf | Yes |

Example 2

A study was conducted to determine whether or not various humectants interfered with the gelation that normally occurs between polyvinyl(alcohol-acetate) and borax in water. Specifically, 10% by weight of a humectant and 5% by weight of 88% polyvinyl(alcohol-acetate) were admixed in water. The various humectants tested at the above ratios are listed in Table 2 below, followed by a characterization as to whether the humectant substantially interfered with gelation, when mixed with 7.5% borax solution in water at 1:1 w/w mixing ratio. Thus, characterizations stating "No" are examples of good humectants for use with the present invention.

TABLE 2

| HUMECTANT TESTED | INTERFERENCE OBSERVERD |
|---|---|
| LEG ™-7 | No |
| Glycerol | Yes |
| Urea | No |
| Betaine | No |
| Diethylene Glycol | Yes |
| Isopropyl Alcohol | Yes |
| 2-Butanol | Yes |
| Polyethylene glycol-400 | No |
| Tetraethylene glycol | No |
| 2-Pyrrolidone | Yes |

Example 3

Preparation of a Fixing Fluid

A fixing fluid was prepared which contained a fixing agent, i.e., borax. This fixing fluid comprised the ingredients described in Table 3 below.

TABLE 3

| Component | Weight Percentage |
|---|---|
| 2-pyrrolidone | 7.5% |
| 1,5-pentanediol | 8.0% |
| Trimethylolpropane | 7.5% |
| Borax (fixing agent) | 7.5% |
| Surfynol ™ 465 | 0.2% |
| Water | balance |

The fixing fluid described above in Table 3 provides a composition that can be jetted from an ink-jet pen with good reliability. Additionally, the borax component acts as the active ingredient that is capable of forming a gel after contact with a polyvinyl(alcohol-acetate) species.

Example 4

Preparation of Ink-jet Ink Composition for Use with a Fixing Fluid

An ink-jet ink composition was prepared which contained partially hydrolyzed polyvinyl(alcohol-acetate). This ink-jet ink composition comprised the ingredients described in Table 4 below.

TABLE 4

| Component | Weight Percentage |
|---|---|
| LEG ™-7 (Liponic) | 20% |
| Polyvinyl(alcohol-acetate) 88% hydrolyzed, M = 15,000 | 3.0% |
| CI Acid Red-52, Lithium salt | 0.1% |
| Surfynol ™ 465 | 0.2% |
| Water | balance |

Example 5

Preparation of Ink-jet Ink Composition for Use with a Fixing Fluid

An inkjet ink composition was prepared which contained partially hydrolyzed polyvinyl(alcohol-acetate). This ink-jet ink composition comprised the ingredients described in Table 5 below.

TABLE 5

| Component | Weight Percentage |
|---|---|
| Polyvinyl(alcohol-acetate), 88% hydrolyzed, M = 15,000 | 5.0% |
| CI Acid Red-52, Lithium salt | 0.1% |
| Surfynol ™ 465 | 0.2% |
| Water | balance |

Example 6

Preparation of Ink-jet Ink Composition for Use with a Fixing Fluid

An ink-jet ink composition was prepared which contained partially hydrolyzed polyvinyl(alcohol-acetate). This ink-jet ink composition comprised the ingredients described in Table 6 below.

TABLE 6

| Component | Weight Percentage |
|---|---|
| Polyvinyl(alcohol-acetate), 88% hydrolyzed, M = 15,000 | 7.0% |
| CI Acid Red-52, Lithium salt | 0.1% |
| Surfynol ™ 465 | 0.2% |
| Water | balance |

Example 7

Printability of Ink-jet Inks of Examples 4-6

Various printing tests were conducted using an HP 2000C printer. The inks of Examples 4-6 were placed in specially designed pens, based on the construction of HP to C4800A black pen, i.e., the geometry of the firing chamber was modified to allow the firing of inks having a higher viscosity. The fixing fluid of Example 3 was deposited from an unmodified HP C4802A pen. The drop volume was set at around 32 pL for the HP C4800A pen (ink-jet ink) and around 8 pL for the HP C4802A pen (fixer). Nozzle diagnostics for each of the inkjet inks were conducted at an increasing frequency of firing, i.e., up to 11 kHz. No firing chamber refill problems were observed up to the 11 kHz firing frequency tested.

Example 8

Fixing Fluid and Ink-jet Ink Deposition

Various printing tests were conducted using a HP 2000C printer. First, a rectangular block of the fixing agent-containing fixing fluid described in Example 3 was printed onto a substrate. Immediately thereafter, the inks of Examples 4-6 were printed directly on top of the fixing agent-containing fixing fluid. This was repeated in the same location three times, i.e., fixing fluid, inkjet ink, fixing fluid, ink-jet ink, fixing fluid, ink-jet ink. The ratio of the number of fixing agent-containing fixing fluid drops to ink-jet ink drops per unit area tested were 0%, 25%, 75%, and 100%. Accordingly, fixer flux to ink flux ratio by volume was 0%, 6.25%, 18.75%, and 25%, respectively.

The substrates tested included Hammermill DP paper and HP premium transparency film plastic sheets. For the plastic sheets, the reverse non-porous side of the sheet was used. With respect to the inks of Examples 4-6, a substantial immobilization of the ink to the surface of the paper was seen when the fixing agent-containing fixing fluid was present. The best immobilization was seen at a 75% fixing agent-containing fixing fluid to ink-jet ink ratio (by the number of drops). The same effect of immobilization was seen on the plastic sheet. Particularly with the plastic substrate, when no fixing fluid was applied, the inks on plastic pulled into irregular puddles.

Example 9

Synthesis of Polyvinyl(Alcohol-acetate) Having Polyethylene Oxide Chains Grafted Thereto Two grams of a poly(vinyl-acetate) polymer were provided having a weight average molecular weight of about 12,800 Mw. The polyvinyl(alcohol-acetate) was dissolved in 100 ml of toluene in a 250 ml flask equipped with a condenser and a mechanical stirrer. At 40° C., 0.1 ml of aqueous 40% NaOH was added to the solution to initiate hydrolysis. After several minutes, to stop the hydrolysis, the system was extracted with water. The toluene solution of the polymer was then reacted with ethylene oxide gas at room temperature in presence of aluminum chloride. After bubbling the ethylene oxide through the toluene solution for 2 hours, the reaction was stopped and the mixture was extracted with water to remove any non-grafted ethylene oxide homopolymers. The hydrolysis of the acetate groups was completed by again adding 1 ml of aqueous NaOH and heating the mixture to 40° C. The hydrolysis proceeded with the precipitation of polyvinyl(alcohol-acetate) having poly(ethylene oxide) chains grafted thereto. After standing for about one-half hour, the mixture was filtered and washed several times with MeOH. The polymer was then washed with MeOH in a Soxhlet extractor to extract sodium acetate and NaOH.

Example 10

Synthesis of Styrene-maleic Anhydride Ester of Polyvinyl(Alcohol-acetate)

About 38 grams of Poly(styrene-co-maleic anhydride) which is cumene terminated, has 75% styrene repeat units, and an average weight average molecular weight of 1,900 Mw was melted in a nitrogen atmosphere. The melt was then mixed with 900 grams of 80% hydrolyzed polyvinyl(alcohol-acetate) (Mw=9,000 to 10,000). This provided a mixing ratio of about one polyvinyl(alcohol-acetate) polymer chain per each maleic anhydride repeat unit. Mechanical mixing occurred for about 24 hours, and the product was dissolved in water and neutralized by sodium hydroxide to a pH of 7. This process produced about 900 grams of a styrene-maleic anhydride ester of polyvinyl(alcohol-acetate).

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A method for printing on specialty media comprising:
   a) providing a fixing fluid containing a fixing agent;
   b) providing a dye- or pigment-based ink-jet ink containing a graft copolymer comprising polyvinyl(alcohol-acetate) hydrolyzed at from 75% to 90% and a second polymer;
   c) jetting the fixing fluid onto a specialty media substrate thereby forming a coated substrate; and
   d) jetting the ink-jet ink onto the coated substrate.

2. A method as in claim 1 further comprising the step of allowing the polyvinyl(alcohol-acetate) of the ink-jet ink and the fixing agent of the fixing fluid to gel on the substrate.

3. A method as in claim 1 wherein the fixing agent is selected from the group consisting of borax, boric acid, copper sulfate, and combinations thereof.

4. A method as in claim 1 wherein the fixing fluid comprises components selected from the group consisting of humectants, wetting agents, surfactants, water and combinations thereof.

5. A method as in claim 1 wherein the dye- or pigment-based ink-jet ink comprises a humectant that does not interfere with gelation.

6. A method as in claim 5 wherein the humectant is selected from the group consisting of polyethylene glycol, glycereth-1, glycereth-7, tetraethylene glycol, urea, tetramethylurea, betaine, betaine hydrochloride, and combinations thereof.

7. A method as in claim 1 wherein the polyvinyl(alcohol-acetate) is hydrolyzed at about 88%.

8. A system for printing on specialty media comprising:
   a) a fixing fluid containing a fixing agent; and
   b) a dye- or pigment-based ink-jet ink comprising a graft copolymer comprising polyvinyl(alcohol-acetate) hydrolyzed at from 75% to 90% and a second polymer.

9. A system as in claim 8 wherein upon printing the ink-jet ink with the polyvinyl(alcohol-acetate) and the fixing fluid with the fixing agent on a substrate, a gel is formed.

10. A system as in claim 8 wherein the fixing agent is selected from the group consisting of borax, boric acid, copper sulfate, and combinations thereof.

11. A system as in claim 8 wherein the fixing fluid comprises components selected from the group consisting of humectants, wetting agents, surfactants, water and combinations thereof.

12. A system as in claim 8 wherein the dye- or pigment-based ink-jet ink comprises a humectant that does not interfere with gelation.

13. A system as in claim 12 wherein the humectant is selected from the group consisting of polyethylene glycol, glycereth-1, glycereth-7, tetraethylene glycol, urea, tetramethylurea, betaine, betaine hydrochloride, and combinations thereof.

14. A system as in claim 8 wherein the graft copolymer of polyvinyl(alcohol-acetate) is hydrolyzed at about 88%.

* * * * *